United States Patent
Hsieh et al.

(10) Patent No.: US 7,675,575 B2
(45) Date of Patent: *Mar. 9, 2010

(54) DISPLAY DEVICE WITH A DETACHABLE HOUSING

(75) Inventors: Kuan-Hong Hsieh, Tu-Cheng (TW); Xin Lu, Shenzhen (CN); Xiao-Guang Li, Shenzhen (CN); Zhong-Wu Tian, Shenzhen (CN); Hsueh-Tsung Lu, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1160 days.

This patent is subject to a terminal disclaimer.

(21) Appl. No.: 11/267,066

(22) Filed: Nov. 4, 2005

(65) Prior Publication Data

US 2006/0098127 A1    May 11, 2006

(30) Foreign Application Priority Data

Nov. 5, 2004    (TW) .............................. 93133741 A

(51) Int. Cl.
*H04N 5/50*    (2006.01)
(52) U.S. Cl. .................................... 348/569
(58) Field of Classification Search ................ 348/569, 348/563, 552, 553, 836, 839; 345/156; 361/681
See application file for complete search history.

(56) References Cited

U.S. PATENT DOCUMENTS

| | | | | | |
|---|---|---|---|---|---|
| 4,127,876 | A | * | 11/1978 | Schwartz | 455/151.2 |
| 4,856,088 | A | * | 8/1989 | Oliwa et al. | 455/349 |
| 5,584,070 | A | * | 12/1996 | Harris et al. | 340/7.54 |
| 6,009,336 | A | * | 12/1999 | Harris et al. | 455/566 |
| 6,219,228 | B1 | * | 4/2001 | Sun | 361/683 |
| 6,339,453 | B1 | | 1/2002 | Chen et al. | |
| 6,563,705 | B1 | * | 5/2003 | Kuo | 361/687 |
| 6,862,741 | B1 | * | 3/2005 | Grooters | 725/39 |
| 6,930,661 | B2 | * | 8/2005 | Uchida et al. | 345/87 |
| 7,233,486 | B2 | * | 6/2007 | Kim | 361/681 |
| 2006/0085762 | A1 | * | 4/2006 | Hsieh et al. | 715/810 |
| 2006/0125783 | A1 | * | 6/2006 | Hsieh et al. | 345/156 |
| 2006/0271965 | A1 | * | 11/2006 | Tokimoto et al. | 725/62 |
| 2007/0008302 | A1 | * | 1/2007 | Uchida et al. | 345/173 |
| 2007/0256545 | A1 | * | 11/2007 | Lee et al. | 84/610 |

* cited by examiner

*Primary Examiner*—Paulos M Natnael
(74) *Attorney, Agent, or Firm*—Zhigang Ma

(57) ABSTRACT

A display device includes a detachable housing, a main body, and an interface unit. The interface unit electrically connects the detachable housing with the main body. The detachable housing includes an OSD unit for storing a plurality of OSD data; a command input unit for generating and sending signals in response to operations of a user; a processing unit for identifying operations of the user, and, if required by the operations, performing predetermined function to obtain OSD data, generating a corresponding control signal, and transmitting the OSD data and the control signal to the main body through the interface unit. The main body displays an OSD menu corresponding to the OSD data and adjusts the parameters of the display device, corresponding to the control signals.

12 Claims, 2 Drawing Sheets

DISPLAY DEVICE WITH A DETACHABLE HOUSING

BACKGROUND OF THE INVENTION

1. Field of the Invention

The present invention relates to a display device with a detachable housing, and particularly to a display device having a detachable housing that can be conveniently replaced if need be.

2. General Background

A typical electronic display device such as a TV or a computer monitor (e.g., an LCD) includes a main body and a housing. For each type of display device, such as LCDs, most of the components thereof are the same. Some differences may include the contents of an on-screen display (OSD) unit, and the structures of a command input unit and a status indication unit. Traditionally, the OSD unit, the command input unit and the status indication unit are all included in the main body. The housing functions only as a cover for covering the main body.

Recently, with the rapid increase of computer users, the demand for individually unique OSD menus and command input units has significantly increased. For example, some users prefer knobs on a command input unit, whereas other users prefer keys or touch pads on the command input unit. Further, some users prefer fewer keys on a smaller command input unit, whereas other users prefer more keys on a more comprehensive command input unit. However, when the OSD unit and the command input unit are contained in the main body of the LCD, a manufacturer of LCDs has to configure an entire unique LCD for each type of different OSD unit. Each time a new type of OSD unit is to be manufactured, time consuming and expensive redesigning and remanufacturing are required.

U.S. Pat. No. 6,339,453 issued on Jan. 15, 2002 and entitled "Television System Having Replaceable Graphics User Interface Architecture" provides a television and an external media module. The television includes a television control unit capable of generating a control signal, apparatus for receiving a video signal, a media controller for generating a graphics signal, and a display unit for displaying either the video signal or a combined video and graphics signal. The external media module, external to the television, is connectable via an interface with the media controller, and performs a graphics on-screen display application in accordance with the television control signal. However, in order to change the type of the command input unit, e.g., knob, key, or touch pad, or/and change the number of knobs or keys or touch pads, the entire display device still needs to be redesigned.

Therefore, a hitherto unaddressed need exists in the industry to address the aforementioned deficiencies and inadequacies.

SUMMARY

The present invention provides a display device having a detachable housing, the detachable housing including an on-screen display (OSD) unit and a command input unit. As a result, efficient large-scale production for the same components of the display device can be performed, with production of the detachable housing only varying according to need.

The display device includes a main body, a detachable housing and an interface unit. The interface unit electrically connects the detachable housing with the main body. The housing includes an OSD unit, a command input unit, a processing unit, and a memory. The OSD unit stores a plurality of OSD data. The command input unit generates and sends signals in response to operations of a user. The processing unit identifies operations of the user, and, if required by the operations, performs predetermined functions to obtain OSD data, generates corresponding control signals, and transmits the OSD data and the control signals to the main body. The main body displays an OSD menu corresponding to the obtained OSD data, and adjusts parameters of the display device via operating the OSD menu, according to the control signals.

The memory stores a control program run by the processing unit. The control program includes a plurality of subprograms for performing the predetermined functions. The predetermined functions mainly include turning on the display device, turning off the display device, and adjusting parameters of the display device.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE PREFERRED EMBODIMENTS

The preferred embodiments of the present invention disclose a display device with a detachable housing. The display device may be, for example, a cathode ray tube (CRT) monitor, a liquid crystal display (LCD), a CRT TV set, a liquid crystal TV set, or another similar kind of display device. For simplicity, the preferred embodiments will be described hereinbelow in relation to an LCD and a CRT TV set. However, the present invention should not be construed as being limited to the embodiments set forth herein. The following detailed description of embodiments is made with reference to the attached drawings.

Figure 1:
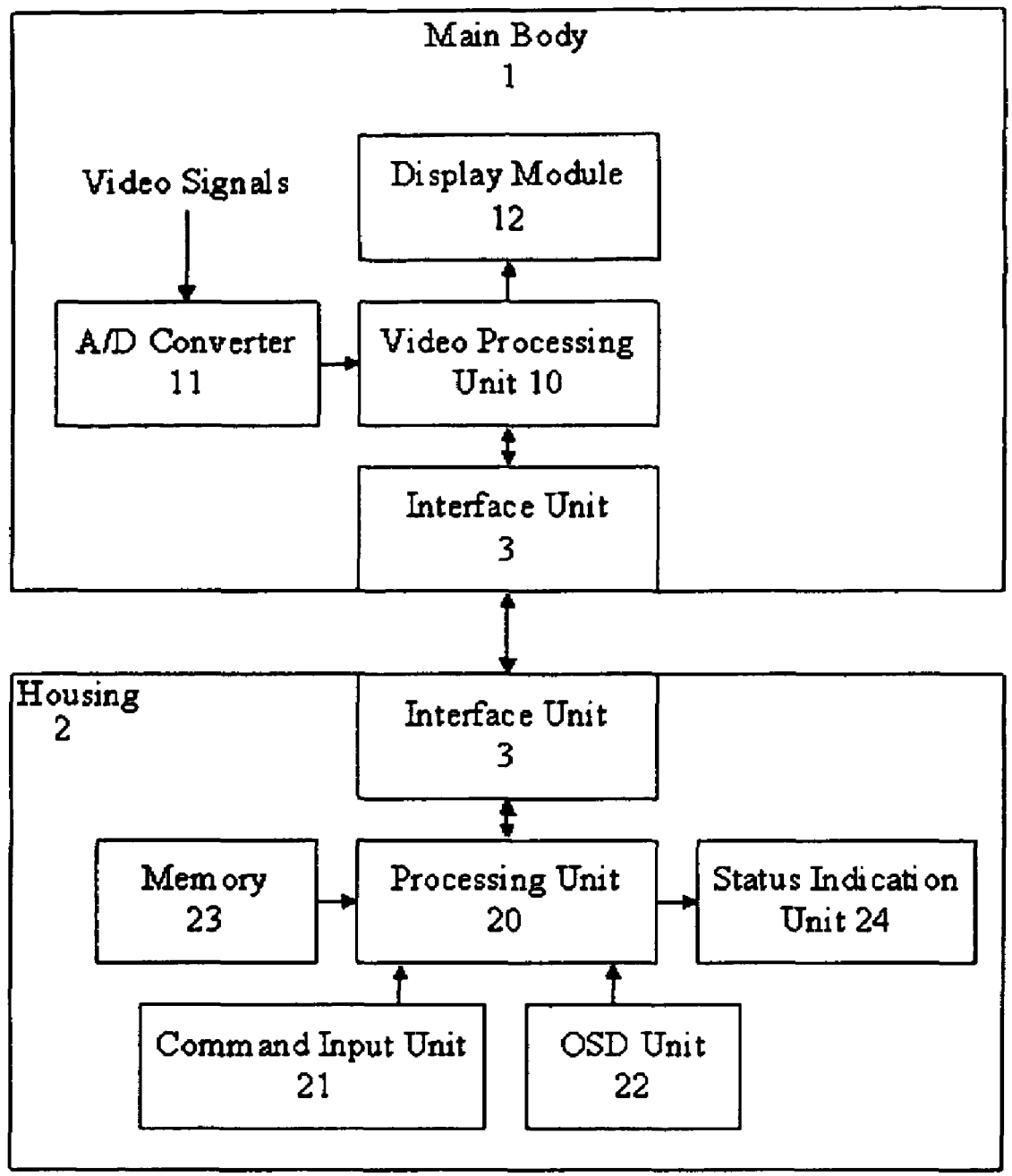
FIG. 1 is a block diagram of hardware infrastructure of a liquid crystal display (LCD) with a detachable housing in accordance with a first preferred embodiment of the present invention.

FIG. 1 is a block diagram of hardware infrastructure of an LCD in accordance with a first preferred embodiment of the present invention. The LCD includes a main body 1, the housing 2, and an interface unit 3. The interface unit 3 may be a display data channel (DDC), a universal serial bus (USB), a small computer system interface (SCSI), or the like. The interface unit 3 electrically interconnects the housing 2 and the main body 1. The main body 1 includes a video processing unit 10, an analog/digital (A/D) converter 11, and a display module 12. The housing 2 includes a processing unit 20, a command input unit 21, an on-screen display (OSD) unit 22, a memory 23, and a status indication unit 24.

The status indication unit 24 is for indicating a status of the LCD, such as an on status, an off status, or a screen-saver status. The command input unit 21 generates and sends signals in response to operations of a user. The operations of the user may include turning on the LCD, turning off the LCD, and adjusting any of various parameters of the LCD. The parameters of the LCD mainly include volume level, color levels, lightness, contrast, vertical position, horizontal position, and so on. The OSD unit 22 stores a plurality of OSD data. When the user operates the command input unit 21 to adjust the parameters of the LCD, the processing unit 20 obtains corresponding OSD data from the OSD unit 22, and generates a control signal for adjusting the parameters of the LCD. When the user operates the command input unit 21 to either turn on or turn off the LCD, the processing unit 20 merely generates a corresponding control signal for turning on or turning off the LCD. The memory 23 stores a control program run by the processing unit 20. The control program includes a plurality of subprograms for turning on the LCD, turning off the LCD, and adjusting the parameters of the LCD.

The A/D converter 11 converts video signals from a computer (not shown) into digital signals, and then transmits the digital signals to the video processing unit 10. The video processing unit 10 transmits the digital signals to the display module 12 for display. Moreover, the video processing unit 10 can overlap the digital signals and OSD data from the processing unit 20, generate overlapped video signals, and transmit the overlapped video signals to the display module 12 for display on a screen display (not shown) of the LCD. This is done when the user initially operates the command input unit 21 to adjust any of the parameters of the LCD. Thereupon, the display module 12 displays an overlapped image, including a video image and an OSD menu, on the screen display, according to the overlapped video signals received from the video processing unit 10. Subsequently, the video processing unit 10 adjusts any of the parameters of the LCD according to a corresponding control signal received from the processing unit 20. Such control signal is generated by the initial operation of the command input unit 21 by the user, and/or by subsequent operation of the command input unit 21 by the user after the OSD menu is displayed. For example, if a control signal for adjusting the color levels is received, the video processing unit 10 adjusts the color levels so as to enhance the display capability of the screen display.

According to description above, the detachable housing 2 of the present invention includes the processing unit 20, the command input unit 21, the on-screen display (OSD) unit 22, the memory 23, and the status indication unit 24. As a result, efficient large-scale production for the same components of the display device can be performed, with production of the detachable housing only varying according to need.

Figure 2:
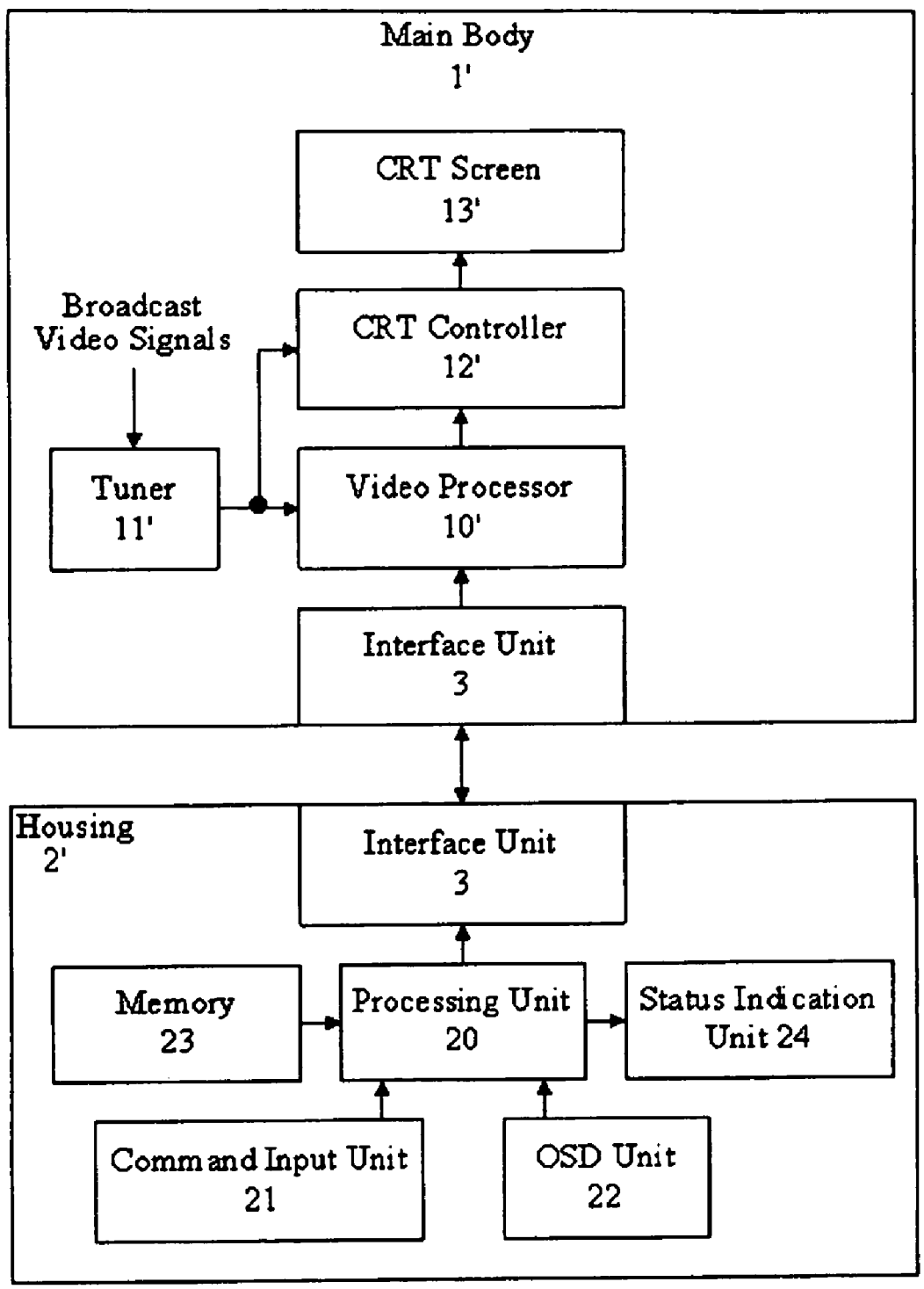
FIG. 2 is a block diagram of hardware infrastructure of a CRT (cathode ray tube) TV set with a detachable housing in accordance with a second preferred embodiment of the present invention.

FIG. 2 is a block diagram of hardware infrastructure of a CRT TV set in accordance with a second preferred embodiment of the present invention. In FIG. 4, components of the CRT TV set which are like those of the LCD of FIG. 1 have the same or similar reference numerals. For brevity, an explanation of such like components will be omitted herefrom. Conversely, components different to those of the LCD of FIG. 1 will be described below. Such components include a video processor 10', a tuner 11', a CRT controller 12', and a CRT screen 13'.

The tuner 11' receives broadcast video signals from an antenna (not shown), and transmits the broadcast video signals to the video processor 10'. The broadcast video signals include chrominance signals, luminance signals, and synchronization signals. The video processor 10' demodulates the broadcast video signals into the chrominance signals, luminance signals and synchronization signals, and overlaps the chrominance signals, luminance signals, and OSD data from the OSD unit 22 to generate overlapped video signals. The video processor 10' then transmits the overlapped video signals and the synchronization signals to the CRT controller 12'. As it detects the synchronization signals, the CRT controller 12' displays an overlapped image on the CRT screen 13', according to the overlapped video signals received from the video processor 10'. The overlapped image includes a video image and an OSD menu. Similarly to the LCD of FIG. 1, the video processor 10' adjusts any of various parameters of the CRT TV set according to a corresponding control signal received from the processing unit 20. Such control signal is generated by initial operation of the command input unit 21 by the user to adjust any of the parameters of the CRT TV set, and/or by subsequent operation of the command input unit 21 by the user after the OSD menu is displayed. The parameters may include volume level, color levels, broadcasting channels, and so on.

It should be emphasized that the above-described embodiments, including preferred embodiments, are merely possible examples of implementations, and are merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention, and be protected by the following claims.

We claim:

1. A display device comprising a main body and a detachable housing, wherein:

the detachable housing comprises:

an on-screen display (OSD) unit for storing a plurality of OSD data;

a command input unit for generating and sending signals in response to operations of a user; and a processing unit for identifying one or more operations of the user, and, if required by the operations, performing predetermined functions to obtain OSD data, generate one or more corresponding control signals, and transmit the OSD data and the control signals to the main body; and the main body is for displaying an OSD menu corresponding to the obtained OSD data, and the main body comprises a video processing unit for adjusting any parameters of the display device according to one or more control signals received from the processing unit.

2. The display device according to claim 1, wherein the parameters are selected from the group consisting of volume level, one or more color levels, lightness, contrast, vertical position, and horizontal position.

3. The display device according to claim 1, further comprising an interface unit, the interface unit being for electrically interconnecting the detachable housing and the main body.

4. The display device according to claim 3, wherein the processing unit transmits the OSD data and the control signals to the main body through the interface unit.

5. The display device according to claim 1, wherein the detachable housing further comprises a status indication unit for indicating statuses of the display device.

6. The display device according to claim 1, wherein the detachable housing further comprises a memory for storing a control program run by the processing unit, the control program comprises a plurality of subprograms for performing the predetermined functions, and the predetermined functions comprise turning on the display device, turning off the display device, and adjusting parameters of the display device.

7. The display device according to claim 1, wherein the main body comprises a display module for displaying the OSD menu.

8. A detachable housing for a display device, the display device having a main body for display, the detachable housing comprising:

an on-screen display (OSD) unit for storing a plurality of OSD data;

a command input unit for generating and sending signals in response to operations of a user; and a processing unit for identifying one or more operations of the user, and, if required by the operations, performing predetermined functions to obtain OSD data, generate one or more corresponding control signals, and transmit the OSD data and the control signals to the main body of the display device; and a status indication unit for indicating statuses of the display device.

9. The detachable housing according to claim 8, further comprising an interface unit for electrically interconnecting the detachable housing with the main body of the display device.

10. The detachable housing according to claim 9, wherein the processing unit transmits the OSD data and the control signals to the main body through the interface unit.

11. The detachable housing according to claim 8, further comprising a memory for storing a control program run by the processing unit, the control program comprising a plurality of subprograms for performing the predetermined functions, the predetermined functions comprising turning on the display device, turning off the display device, and adjusting parameters of the display device.

12. The detachable housing according to claim 11, wherein the parameters are selected from the group consisting of volume level, one or more color levels, lightness, contrast, vertical position, and horizontal position.

* * * * *